US011429186B2

(12) United States Patent
Lee et al.

(10) Patent No.: US 11,429,186 B2
(45) Date of Patent: Aug. 30, 2022

(54) LOCATION-BASED ENTITY SELECTION USING GAZE TRACKING

(71) Applicant: Microsoft Technology Licensing, LLC, Redmond, WA (US)

(72) Inventors: Austin S. Lee, Seattle, WA (US); Mathew J. Lamb, Seattle, WA (US); Anthony James Ambrus, Seattle, WA (US); Amy Mun Hong, Redmond, WA (US); Jonathan Palmer, Bellevue, WA (US); Sophie Stellmach, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/951,940

(22) Filed: Nov. 18, 2020

(65) Prior Publication Data
US 2022/0155857 A1    May 19, 2022

(51) Int. Cl.
    *G06F 3/01*     (2006.01)
    *G06N 20/00*    (2019.01)
    *G06N 5/04*     (2006.01)
    *G06F 3/16*     (2006.01)

(52) U.S. Cl.
    CPC .............. *G06F 3/013* (2013.01); *G06N 5/04* (2013.01); *G06N 20/00* (2019.01); *G06F 3/017* (2013.01); *G06F 3/167* (2013.01)

(58) Field of Classification Search
    CPC .............................................. G06F 3/012–013
    See application file for complete search history.

(56) References Cited

U.S. PATENT DOCUMENTS

2013/0335405 A1* 12/2013 Scavezze ............... A63F 13/61
                                                            345/419
2018/0321903 A1    11/2018 Vennström et al.
(Continued)

OTHER PUBLICATIONS

Fu, et al., "What Can Computational Models Learn from Human Selective Attention? A Review from an Audiovisual Crossmodal Perspective", In Repository of arXiv:1909.05654, Sep. 5, 2019, pp. 1-29.
(Continued)

*Primary Examiner* — Hang Lin
(74) *Attorney, Agent, or Firm* — Alleman Hall Creasman & Tuttle LLP

(57) ABSTRACT

One example provides a computing device comprising instructions executable to receive information regarding one or more entities in the scene, to receive eye tracking a plurality of eye tracking samples, each eye tracking sample corresponding to a gaze direction of a user and, based at least on the eye tracking samples, determine a time-dependent attention value for each entity of the one or more entities at different locations in a use environment, the time-dependent attention value determined using a leaky integrator. The instructions are further executable to receive a user input indicating an intent to perform a location-dependent action, associate the user input to with a selected entity based at least upon the time-dependent attention value for each entity, and perform the location-dependent action based at least upon a location of the selected entity.

20 Claims, 11 Drawing Sheets

(56) References Cited

U.S. PATENT DOCUMENTS

2019/0313200 A1* 10/2019 Stein .................. H04S 3/008
2020/0202849 A1   6/2020 Cartwright et al.

OTHER PUBLICATIONS

"International Search Report and Written Opinion Issued in PCT Application No. PCT/US21/054884", dated Feb. 1, 2022, 13 Pages.
Qu, et al., "The Role of Interactivity in Human-Machine Conversation for Automatic Word Acquisition", In Proceedings of the SIGDIAL Conference, Sep. 11, 2009, pp. 188-195.

* cited by examiner

LOCATION-BASED ENTITY SELECTION USING GAZE TRACKING

BACKGROUND

A computing device may employ an eye-tracking sensor as a user input mechanism. Eye-tracking sensors can be used to determinate a gaze direction of an eye of a user. The determined gaze direction can then be used to identify an object at which the user is gazing, thereby allowing a user input, such as a speech command, to be associated with the object.

SUMMARY

Examples are disclosed that relate to performing a location-dependent action based on a user input and a spatial intent model. One example provides a computing device comprising instructions executable to receive information regarding one or more entities in the scene, to receive eye tracking a plurality of eye tracking samples, each eye tracking sample corresponding to a gaze direction of a user and, based at least on the eye tracking samples, determine a time-dependent attention value for each entity of the one or more entities at different locations in a use environment, the time-dependent attention value determined using a leaky integrator. The instructions are further executable to receive a user input indicating an intent to perform a location-dependent action, associate the user input to with a selected entity based at least upon the time-dependent attention value for each entity, and perform the location-dependent action based at least upon a location of the selected entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
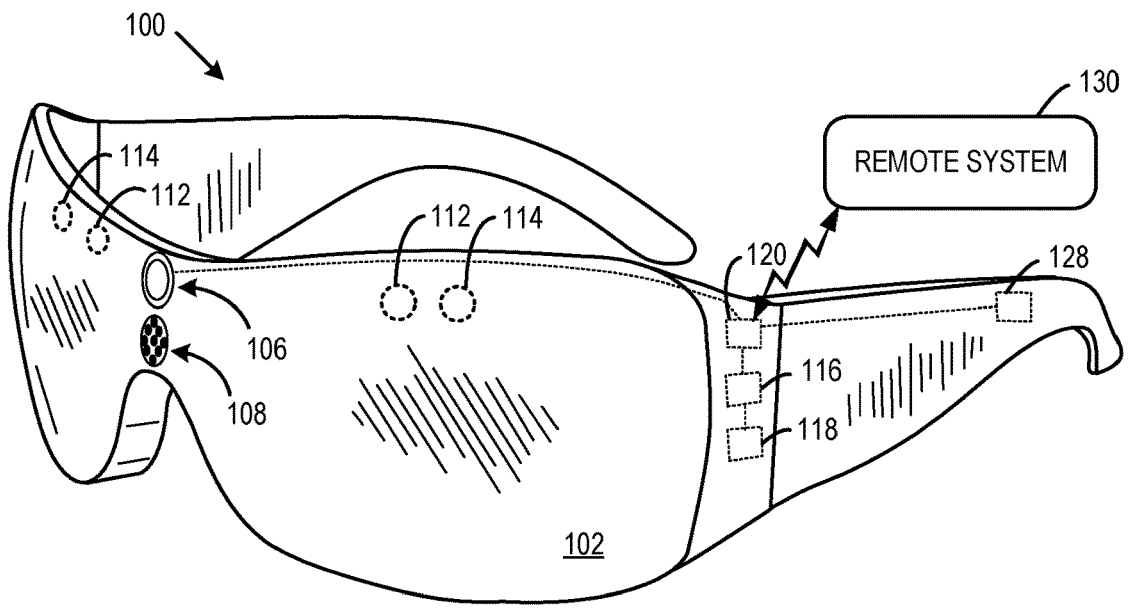
FIG. 1 shows an example computing device comprising an eye-tracking system.

As mentioned above, a computing system may utilize an eye-tracking sensor to sense a user's gaze direction as a user input modality. Based on eye-tracking sensor data and one or more anatomical models to account for such parameters as eye and head geometries, the eye-tracking system can project a gaze line that represents a gaze direction from each sensed eye. The computing system then can use the resulting gaze direction(s) to identify any displayed virtual objects that each gaze lines intersect. Further, in the case of a head-mounted augmented reality display system, image data from an outward-facing image sensor calibrated to the eye-tracking system can be used to identify any real objects in the real-world scene intersected by the gaze direction. In this manner, eye-tracking sensors can be used to associate user commands made by speech, gesture, button, or other input mechanism with real or virtual objects.

However, it can be difficult to associate a command with an intended real or virtual object using gaze. This is due at least in part to saccadic eye movements performed naturally by the human eye, whereby a user tends to move their eyes rapidly around a scene. For example, a user may be gazing mostly at one object of interest while glancing for brief moments toward other objects/locations in the scene due to saccadic eye movements. If a command is associated with an object based solely upon a time that the command is detected, the command may be incorrectly associated with an object other than the object of interest.

As a more specific example, a user of an augmented reality display device may intend to perform a command to place a virtual object onto a first physical object viewable through the augmented reality display system by gazing at the first physical object and saying "put that there." However, due to saccadic eye motion, the user may gaze briefly toward a second physical object around the time the command is made. As a result, the computing device may determine that the user intended to associate the command with the second physical object and thus fail to correctly place the virtual object on the first physical object.

As one possible solution to this issue, a computing device may employ a gaze dwell time as a condition to recognize a gaze-based selection. However, as human eyes naturally follow saccadic gaze paths, a user may find that it feels unnatural to use such a dwell-based gaze selection system.

Accordingly, examples are disclosed that relate to using a spatial intent model to associate a user input with a gaze direction. Briefly, a computing device maintains time-dependent attention values for different identified entities at different locations in a viewed scene. For each identified entity, an attention value is calculated based on the eye-gaze samples and updated over time. Upon receiving a user input comprising a location-dependent action, the computing device utilizes the spatial intent model to associate the user input with a selected identified entity. The location-dependent action may then be executed based on the user input and the selected entity. As described in more detail below, the time-dependent attention value for an entity decays over a period of time when a user looks away from the entity, rather than immediately. Thus, the spatial intent model may maintain a relatively high attention value for the correct selected entity even where a user gazes at other entities due to saccadic eye motion.

FIG. 1 shows an example computing system in the form of a head-mounted display device 100 comprising an augmented reality (AR) display 102. The AR display 102 may comprise any suitable display mechanism (e.g., a scanned beam projector or microdisplay (e.g. an LCoS microdisplay) with a waveguide-based or prism-based combiner, as examples) to display virtual imagery over a real-world background viewable through the combiner. Images displayed on AR display 102 may comprise stereoscopic images of virtual objects overlayed on the real-world scene such that the virtual objects appear to be present in the real-world scene. Display device 100 also comprises an outward-facing camera system, depicted schematically at 106, which may comprise one or more of a depth camera system (e.g., time-of-flight camera, structured light camera, or stereo camera arrangement), an intensity camera (RGB, grayscale, or infrared), and/or other suitable imaging device. Imagery from outward-facing camera system 106 can be used to form a map of an environment. As a more specific example, raw depth data from depth images of different regions of the use environment can be used to construct a point cloud depth representation of the use environment. This point cloud representation then may be used to form a surface reconstruction of the environment. In some examples, one or more classifiers (e.g. trained neural networks such as convolutional neural networks and/or other suitable machine learning function(s)) can be used to identify objects in the imagery, thereby allowing objects in the scene to be recognized and tagged as entities for identification by speech command or other inputs. Such classification may be used to identify objects such as walls, floors, ceilings, doors, windows and other structural features and/or segments thereof; tables, chairs and other furniture; televisions, computers, phones, tables, and other devices; pictures, vases and other decorative objects; and/or any other suitable entities.

Outward-facing camera system 106 may also capture user hand motion and thus may be used for gesture inputs. Display device 100 further may comprise an acoustic receiver 108, such as a microphone or microphone array, configured to receive audio inputs, such as speech inputs from the user.

Display device 100 also comprises an eye-tracking sensor to determine a gaze direction of an eye of a user. In some examples, the eye-tracking sensor for each eye comprises one or more eye tracking cameras, illustrated schematically at 112, and one or more glint light sources, illustrated schematically at 114. In one more specific example, four glint light sources and one image sensor may be used for each eye. Each glint light source 114 is configured to direct a beam of light (e.g. infrared light) toward the cornea of the eye. Image data from each eye tracking camera is analyzed to determine the location of a glint from each glint light source and a location of the pupil of the eye. The glint and pupil location data may then be used to determine a gaze direction, potentially in combination with suitable anatomical models related, for example, to eye geometry and/or head geometry. In the depicted example, the glint light source(s) 114 and corresponding eye tracking camera 112 are depicted as being positioned above the eye. In other examples, the eye tracking camera and glint light sources may be positioned below the eye, to a side of the eye, or in any other suitable location.

Display device 100 further may comprise a global positioning system 116 and one or more motion sensors 118. Global positioning system 116 may be used to determine a user's location. The user's location, in turn, may be used to obtain any previously-constructed depth maps for the current use environment, and/or obtain information on the identities and locations of previously-identified entities in the use environment, as examples. Motion sensor data from motion sensor 118 may be used to track changes in the position and orientation of the display device 100 in the use environment to facilitate gaze tracking. Display device 100 may also comprise an audio output device 128 comprising one or more speakers configured to output audio content to the user. In some example, a speaker may be positioned near each ear. In other examples, display device 100 may connect to external speakers, such as ear buds or headphones.

Display device 100 also comprises a controller 120 and a communication subsystem for communicating via a network with one or more remote computing systems 130. Controller 120 comprises, among other components, a logic subsystem and a storage subsystem that stores instructions executable by the logic subsystem to control the various functions of display device 100. Examples of such functions are described in more detail below.

Figure 2:
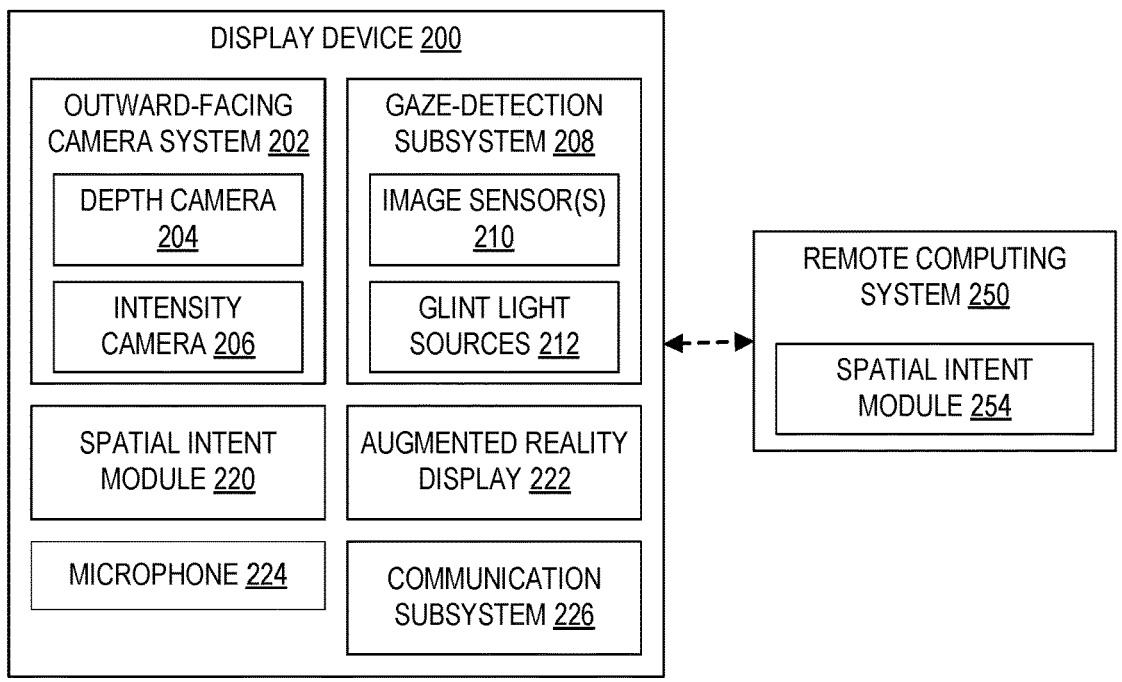
FIG. 2 shows a block diagram of an example computing system comprising an eye-tracking system and a spatial intent module.

FIG. 2 shows a block diagram of an example display device 200. Display device 100 is an example implementation of display device 200. As described above with regard to FIG. 1, display device 200 comprises an outward-facing camera system 202 including a depth camera 204 and/or intensity camera 206. Display device 200 also comprises gaze-detection subsystem 208. Gaze detection subsystem 208 comprises one or more glint light sources 212, and one or more image sensors 210 configured to capture an image of each eye of the user. Display device 200 further comprises an augmented reality display 222, optionally a microphone 224, and a communication subsystem 226 to communicate with one or more remote computing systems 250.

Display device 200 further comprises a spatial intent module 220 to help disambiguate potentially ambiguous gaze signals. Spatial intent module 220 may take the form of instructions stored in computer memory on display device 200 that are executable by one or more logic devices on display device 200. Further, spatial intent module 220 may be at least partially implemented on remote computing system 250, as indicated at 254.

As described above, ambiguous gaze signals caused by saccadic eye movement pose challenges for associating a user input with an intended entity. To help disambiguate an intended entity associated with a command, spatial intent module 220 determines a time-dependent attention value for each recognized entity in the use environment based upon the gaze samples from an eye-tracking system. When a user input indicating an intent to perform a location-dependent action is received, spatial intent module 220 determines a selected entity to associate with the input based upon the time-dependent attention values. By updating the time-dependent attention values as eye tracking sample data is received, the spatial intent module may provide insight into those entities that are the current focus of a user's attention, even where saccadic eye movement may direct the user's gaze to other entities.

Figure 3A:
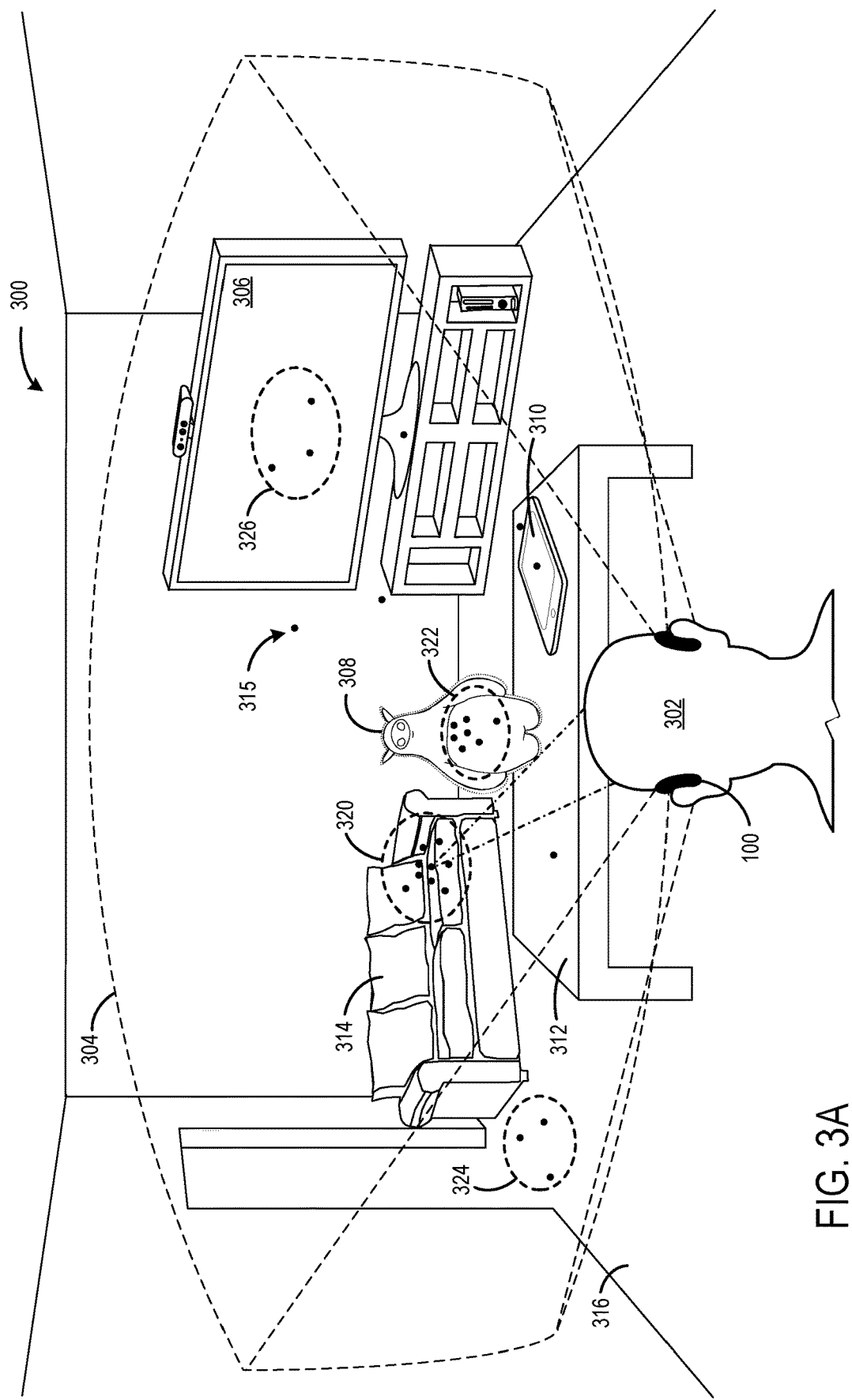
FIGS. 3A-3C schematically show a gaze direction of a user over time.
Figure 3B:
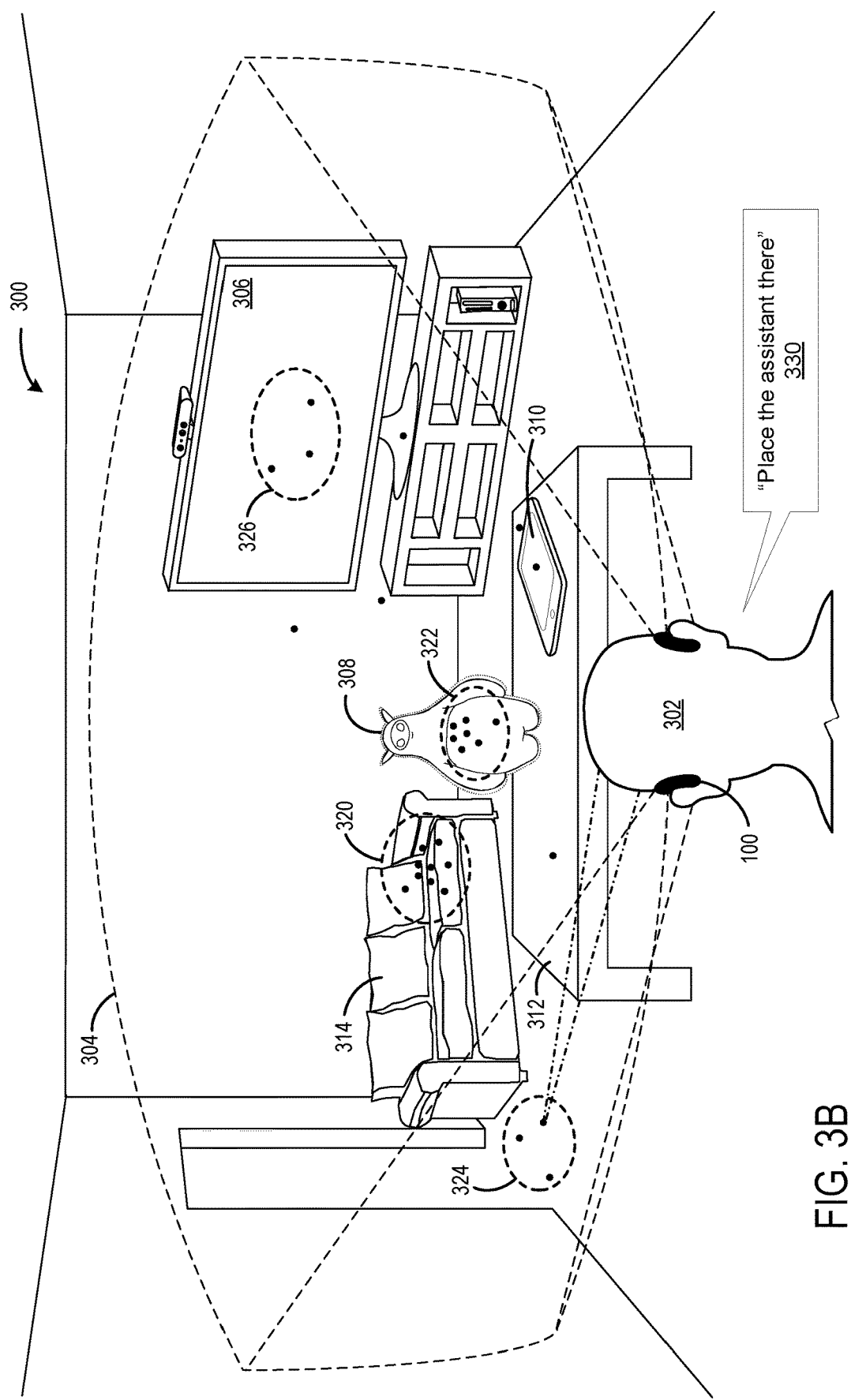
Figure 3C:
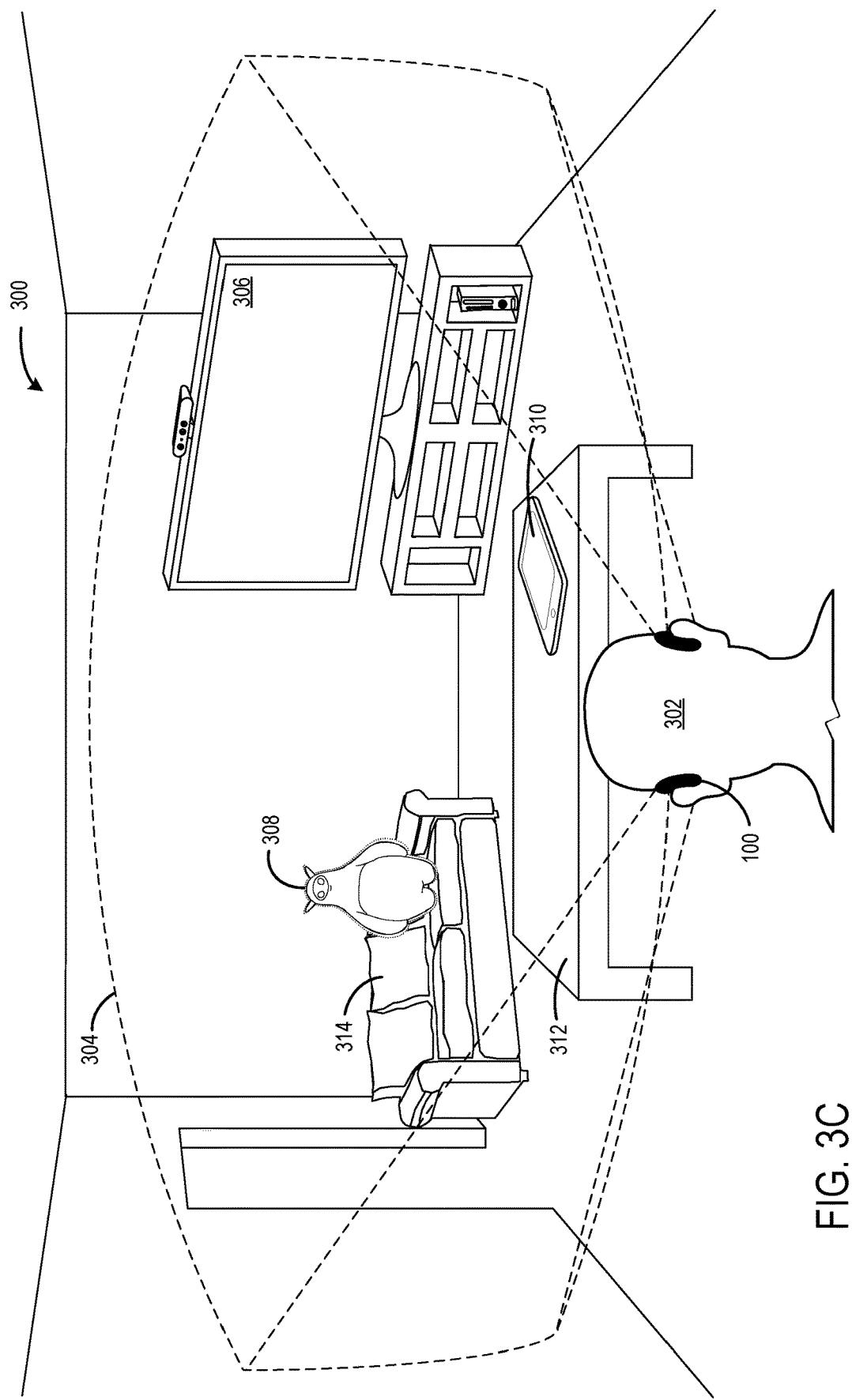

FIGS. 3A-3C show a scene 300 viewed by user 302 wearing display device 100. Scene 300 comprises a plurality of entities, such as objects, structures and surfaces in the room, that are visible in field of view 304. Dots represent eye-gaze locations as determined from eye gaze samples acquired by an eye-tracking system. The example entities in FIG. 3A include a display 306, a displayed character representing a virtual assistant 308, a tablet computing device 310, a table 312, a sofa 314, and a floor 316.

Entity data comprising the location and identity of each virtual and real entity may be stored in memory on display device 100. Any suitable data model may be employed to maintain entity information. For example, locations of entities may be stored as an absolute location within a coordinate system of a real-world space model, as a location relative to display device 100, or other suitable data model. Location information may be updated, for example, as a displayed virtual object moves or as a physical object is moved.

Eye-tracking sensors 112 detect gaze directions for the user's eyes. Controller 120 of display device 100 may compare the entity location information to the gaze directions to determine whether the gaze directions intersect any identified entities in the scene, real or virtual. In FIG. 3A, user 302 is gazing towards sofa 314. Other recent gaze samples, indicated by dots (an example of which is shown at 315), illustrate that the user's gaze also has been directed to other locations in the room, including toward other recognized entities, whether due to intent or to saccadic motion. For example, a plurality of gaze samples 322 were detected toward virtual assistant 308, a plurality of gaze samples 324 to floor 316, and a plurality of gaze samples 326 on display 306.

Referring next to FIG. 3B, user 302 makes a speech input 330 to "place the assistant there." In view of the number of recent gaze samples directed toward sofa 314, the user may intend for the command to be associated with sofa 314. However, due to saccadic eye motion, the eye-tracking sensors 112 record an eye-gaze sample directed toward floor 316 at or around the time speech input 330 was made. In the absence of a spatial intent model, the user input may be incorrectly associated with floor 316. However, as described in more detail below, the disclosed example spatial intent models comprise attention values for each identified entity in the scene, where the attention value for an entity is based at least upon a number of gaze samples acquired that correspond to the entity and also times when the gaze samples were acquired. Here, as the plurality of eye-gaze samples 320 corresponding to sofa 314, the spatial intent model correctly determines that the selected entity is sofa 314. As shown in FIG. 3C, as a result of the determination, display device 100 performs a location-dependent action by placing avatar 308 on sofa 314.

The spatial intent model may determine time-dependent attention values representative of a user's attention to different entities via a mathematical model such as a leaky integrator. A gaze sample with a direction that intersects an entity (or in some examples that is within a threshold distance of the entity, or meets other suitable condition with regard to the entity) is treated as an input into the leaky integrator for that entity, and the leaky integrator integrates the input according to a mathematical function. Further, the attention value for each entity "leaks," or decays, over time. As such, when a user gazes towards an entity, the time-dependent attention value for the entity increases with time. Likewise, when the user looks away from the entity, the time-dependent attention value decreases. The attention value for an entity may asymptotically increase to a maximum value based on the rate of the leak. In various examples, the leaky integrator may comprise a first-order low-pass filter, a first-order differential equation, a higher-order differential equation, or other suitable mathematical function. As a more specific example, a leaky integrator function may comprise a differential equation in the form of $$\frac{dx}{dt} = -Ax + C,$$

where C is the input and A is a rate constant representing the time constant for the leak. As such, the time-dependent attention value $x_n(t)$ for entity n during a time period of constant input may take the form of $x_n(t) = ke^{-At} + x_{n,0}$, where k is a constant and $x_{n,0}$ is the time-dependent attention value of entity n at time t=0. If the input changes at a future time, the equation for the time-dependent attention value may take a similar form, but with different constants. In other examples (e.g., higher-order differential equations), the rate constant A may be a function of time t, attention value $x_n$, attention value $x_m$ for a different entity m, number of entities, and/or other factor. In other examples, the leaky integrator function may comprise a different equation form.

Figure 4:
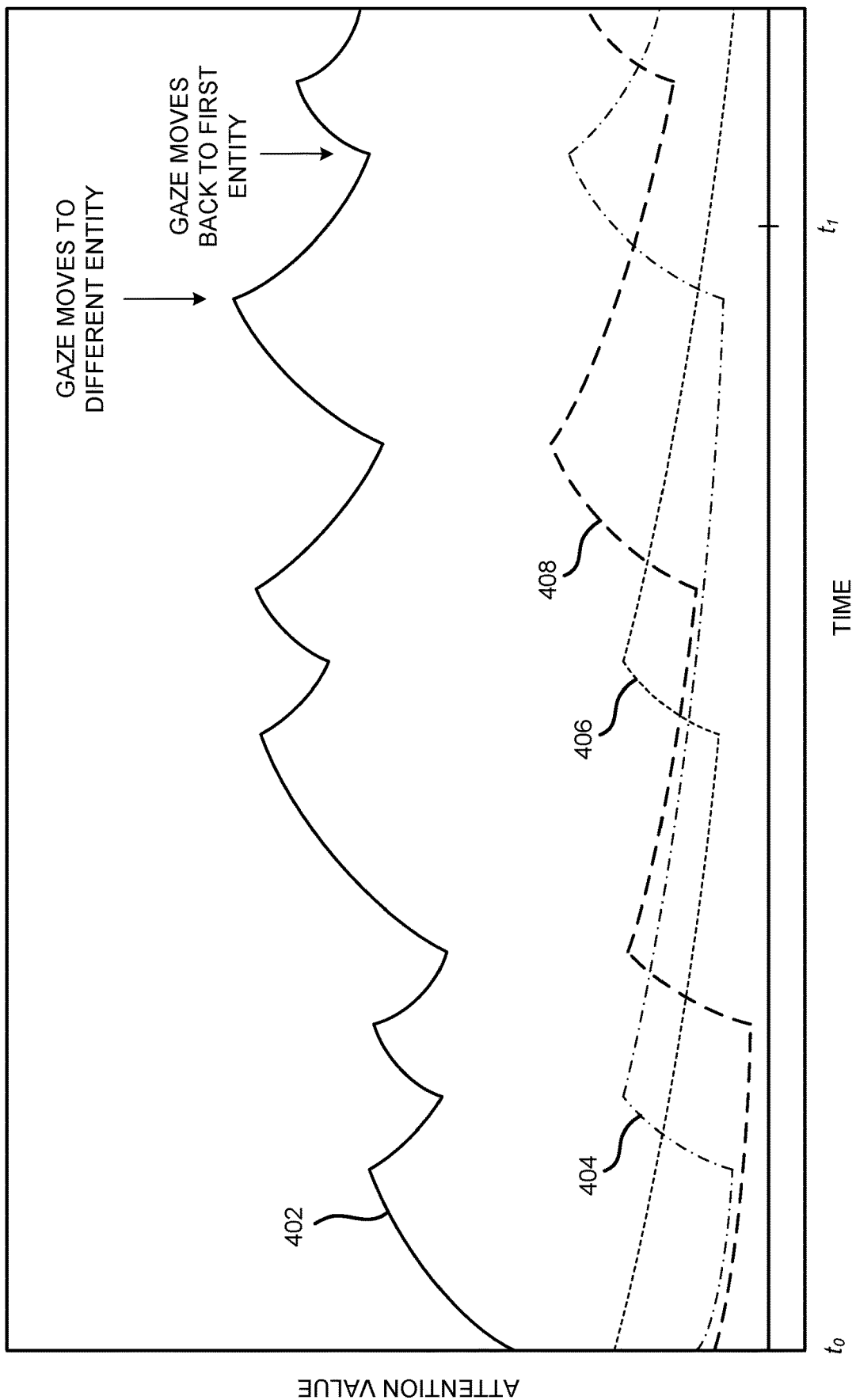
FIG. 4 shows an example graph depicting an attention value as a function of time for each of the identified entities at which the user gazed in FIG. 3.

FIG. 4 shows a graph of example time-dependent attention values corresponding to a user's gaze towards entities of FIGS. 3A-3C. In this example, the time-dependent attention values are calculated via a leaky integrator in the form of a first order differential equation as described above. Time-dependent attention value 402 models the user's attention to sofa 314. Likewise, time-dependent attention values 404, 406, and 408 model the attention respectively to floor 316, display 306, and avatar 308. At time $t_0$, the user is gazing towards sofa 314 and attention value 402 is increasing. The rate of increase may slow as the attention value increases. At a later time, the user looks towards a different object and attention value 402 begins to decrease (leak) while the attention value for the different entity begins to increase. When the user gazes back towards sofa 314, attention value 402 increases again.

In this example, the speech command is received at time $t_1$. The eye-gaze samples received at and around time $t_1$ are associated with floor 316, and as such attention value 404 increases. However, attention value 402 for sofa 314 remains relatively greater than the other attention values 404, 406, 408, as the number of samples integrated for attention value 402 in combination with the decay rate keeps attention value 402 above the others. This indicates that the floor gaze samples 324 may have arisen due to saccadic eye motion. As such, by using the spatial attention model, the user input is correctly associated with sofa 314.

Figure 5:
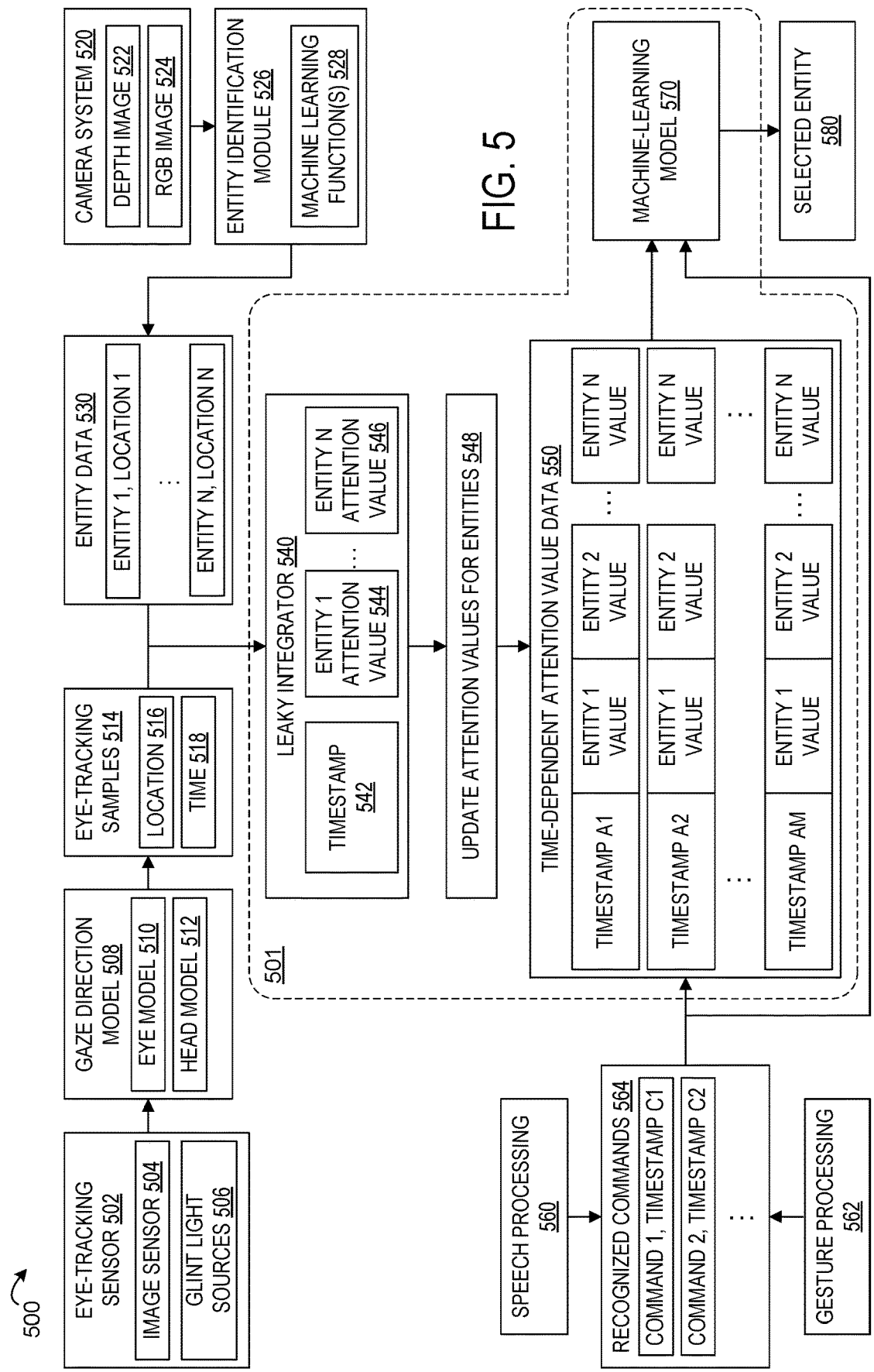
FIG. 5 shows a block diagram of an example system for associating a command with a gaze location using a spatial intent model.

FIG. 5 schematically shows a system for associating user inputs with gaze locations 500 that utilizes an example spatial intent model 501. The processing pipeline may be implemented on any suitable computing system, such as display device 100 (via controller 120), display device 200, and/or remote computing system 250, as examples.

System 500 comprises a gaze pipeline and one or more user input pipelines. In the gaze pipeline, eye-tracking sensor 502 outputs eye tracking signals to gaze direction model 508. Eye-tracking sensor 502 comprises an image sensor 504 and glint light sources 506. Based on the eye tracking signals, gaze direction model 508 determines a gaze direction of the user. Gaze direction model 508 may employ an eye model 510 and/or a head model 512 for the determination of gaze direction. With this information, the computing system (e.g., display device 100) can detect whether the gaze direction of an eye tracking sample intersects any identified entities. Where the gaze lines do intersect entities, the corresponding eye tracking samples 514 are input into leaky integrator 540.

System 500 further comprises entity information related to entities in the scene viewable by the user. In the depicted example, camera system 520 images a scene via depth camera 522 and/or RGB camera 524. Image data comprising depth images and/or RGB images are processed by an entity identification module 526, which identifies one or more entities in the scene. Entity identification module 526 may comprise one or more trained machine learning functions 528 trained to identify entities in a scene based on image data of the scene. Any suitable machine learning function may be used, including one or more neural networks convolutional neural networks). The entity identification module 526 outputs an entity list 530 of entities and corresponding entity locations within the scene. Further, in some examples, a list of entities previously identified in the use environment (e.g. in an earlier use session, or identified by another computing device) may be obtained, for example, from a remote computing system.

Based on a comparison of eye tracking samples 514 and the entity locations in entity list 530, leaky integrator 540 assigns eye tracking samples to corresponding entities and updates time-dependent attention values for each entity. The attention values for each entity as updated are stored with timestamps corresponding to a most recent eye tracking sample. For example, if a location 516 at a time 518 corresponds to the location 1 of entity 1, the leaky integrator may determine a positive input signal for the entity 1 and a zero input signal for other entities at the time 518.

After determining updated attention values, the updated attention values and corresponding timestamp are stored in a data structure for time-dependent attention value data 550, which also stores a number of previously determined time-dependent attention values. The stored time-dependent attention value data 550 may then be used to match user inputs with time-dependent attention values based upon a timestamp for the user input.

User input to system 500 may comprise user speech inputs and/or user gesture inputs, as examples. Thus, a speech processing system 560 may output recognized commands from speech inputs received at a microphone, and a gesture processing system 562 may output recognized gesture commands. Recognized commands 564 may include location-dependent commands, as described above. As such, where a recognized command comprises a location-dependent term (e.g. "that", "there," "here,") or a term that is ambiguous as referring to multiple possible entities (e.g. "open my photo app" where multiple devices in the environment can perform the command), the time-dependent attention value data 550 may be used to disambiguate the command. In some examples, a timestamp for a recognized command may be compared to timestamps for time-dependent attention values to determine which attention values to use for entity selection.

After selecting time-dependent attention values, an entity corresponding to the recognized command is selected. In some examples, an entity with a highest attention value may be selected as the entity to associate with the command. In other examples, the recognized command, attention value data 550, and entity data 530 are input into a machine learning model 570, which outputs likelihoods of each entity being the intended entity. Machine learning model 570 may be trained, for example, with labeled training data comprising a plurality of data samples, each sample comprising a command, attention value data, entity data, and a labeled entity corresponding to the correct entity selection.

Figure 6:
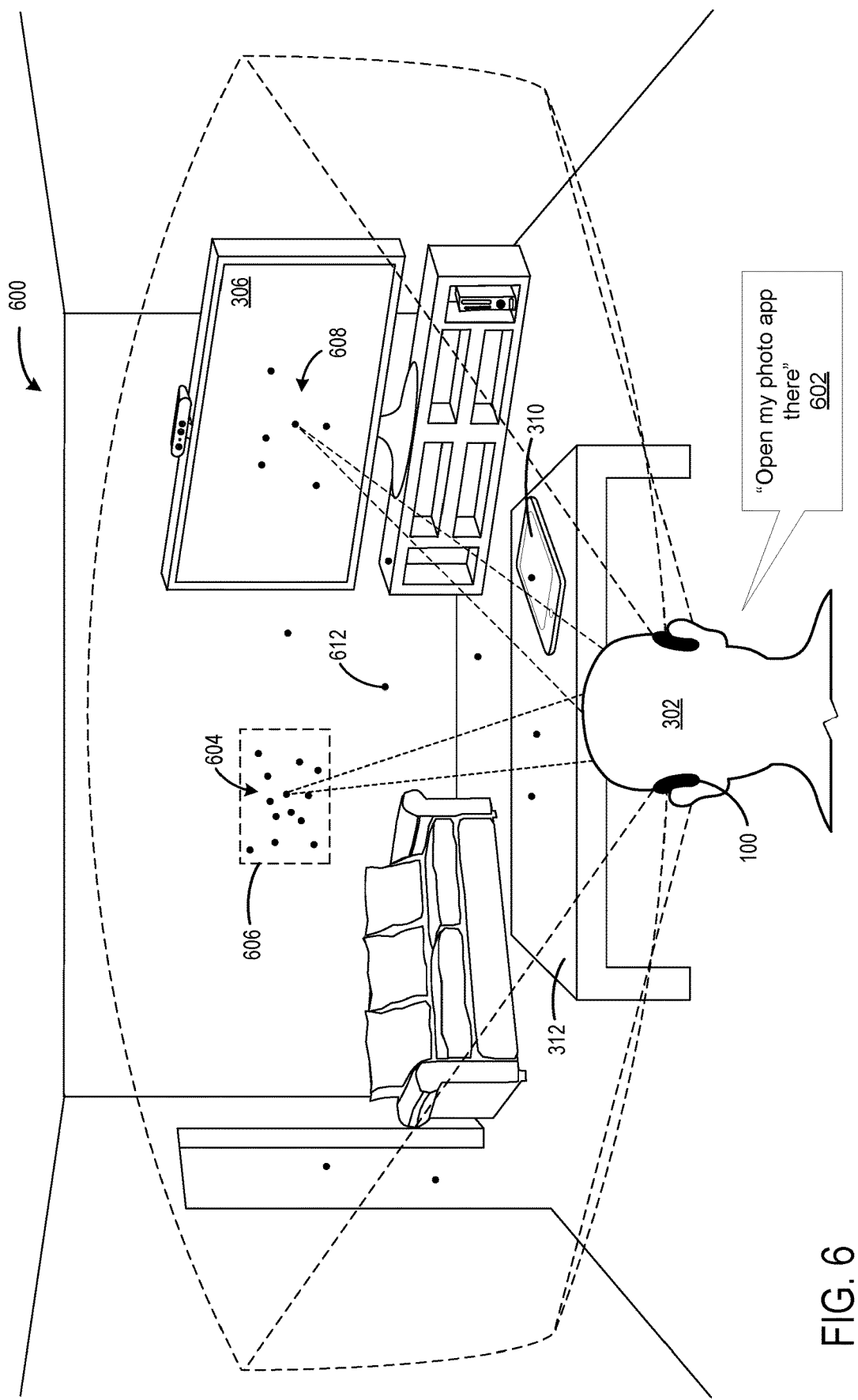
FIG. 6 shows an example scenario in which a spatial intent model is used to disambiguate a command to open an application.

In the example of FIGS. 3A-3C above, time-dependent attention values were used to disambiguate possible locations to place a virtual object. FIG. 6 shows another example scenario 600 in which a user makes the speech command "open my photo app there." User input 602 is processed into a recognized command to open a photo app at an ambiguous location (i.e., "there"). The spatial intent module receives eye-gaze samples 604 corresponding to wall location 606, eye-gaze samples 608 corresponding to display 306, and additional eye-gaze samples, such as eye-gaze sample 612. Based on the plurality of eye-gaze samples, the spatial intent module determines a selected entity based on the time-dependent attention values for wall location 606 and the time-dependent attention values for display 306, plus any other recognized entities in the use environment. If wall location 606 is determined to be the selected entity, display device 100 opens the photo app as a virtual object at wall location 606. If screen 306 is determined to be the selected entity, display device will instead transmit information to display 306 to open photos from the photo app on screen 306.

Figure 7:
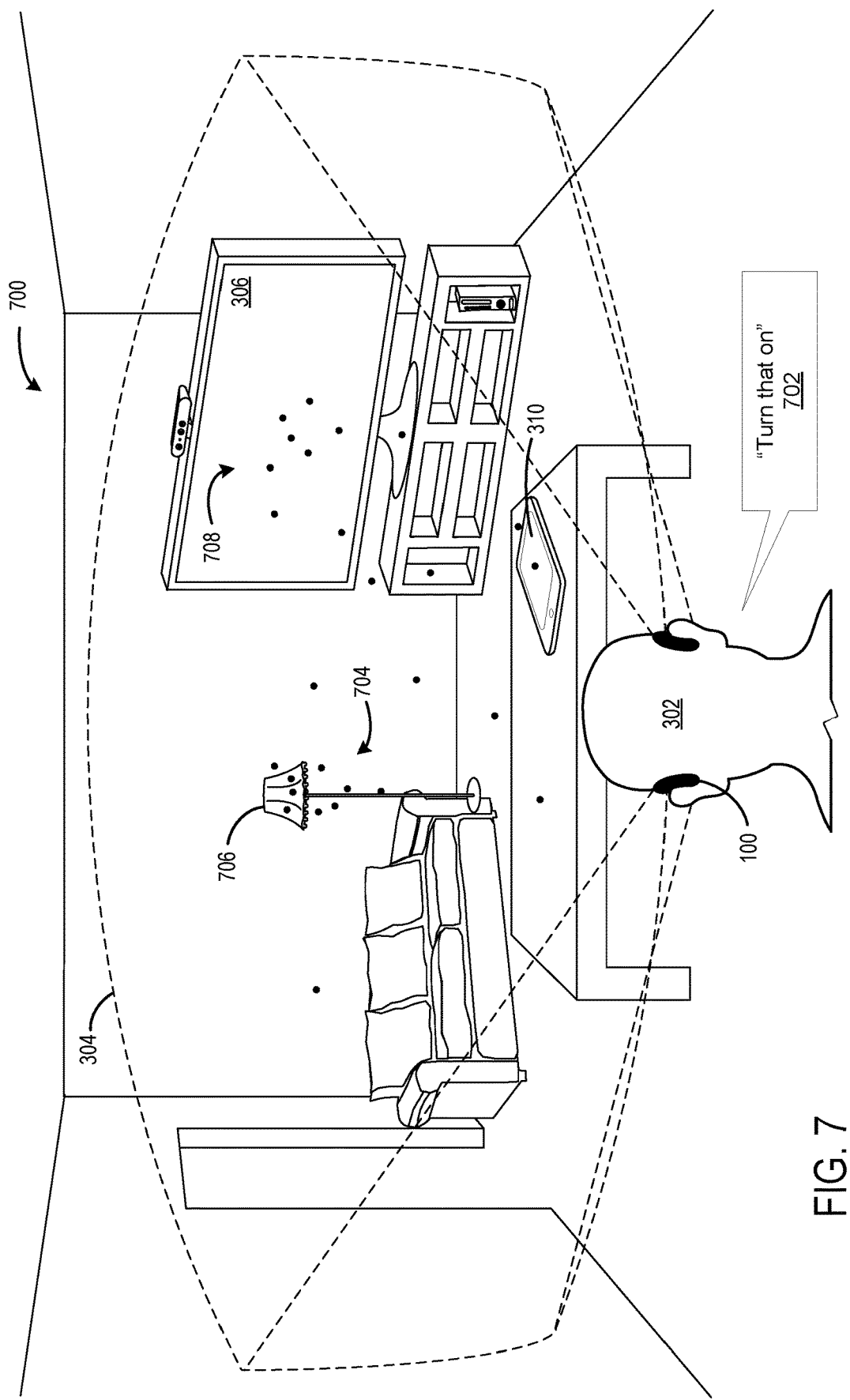
FIG. 7 shows an example scenario for using a spatial intent model to disambiguate a command to operate a real-world object.

FIG. 7 shows another example scenario 700 in which time-dependent attention values can be used to disambiguate a command. In scenario 700, user 302 may desire to turn on lamp 706. In scenario 700, lamp 706 comprises an internet-of-things (IoT) device controllable by display device 100. Display 306 and tablet 310 are also controllable via display device 100. User 302 says "turn that on." Around the time of the speech input, eye-tracking sensors record a plurality of eye tracking samples 704 and eye tracking samples 708, in addition to other eye tracking samples. Based on the time-dependent attention values for these entities, spatial intent model 501 selects lamp 706 for association with user input 702. As such, display device 100 sends a signal instructing lamp 706 to turn on.

Figure 8A:
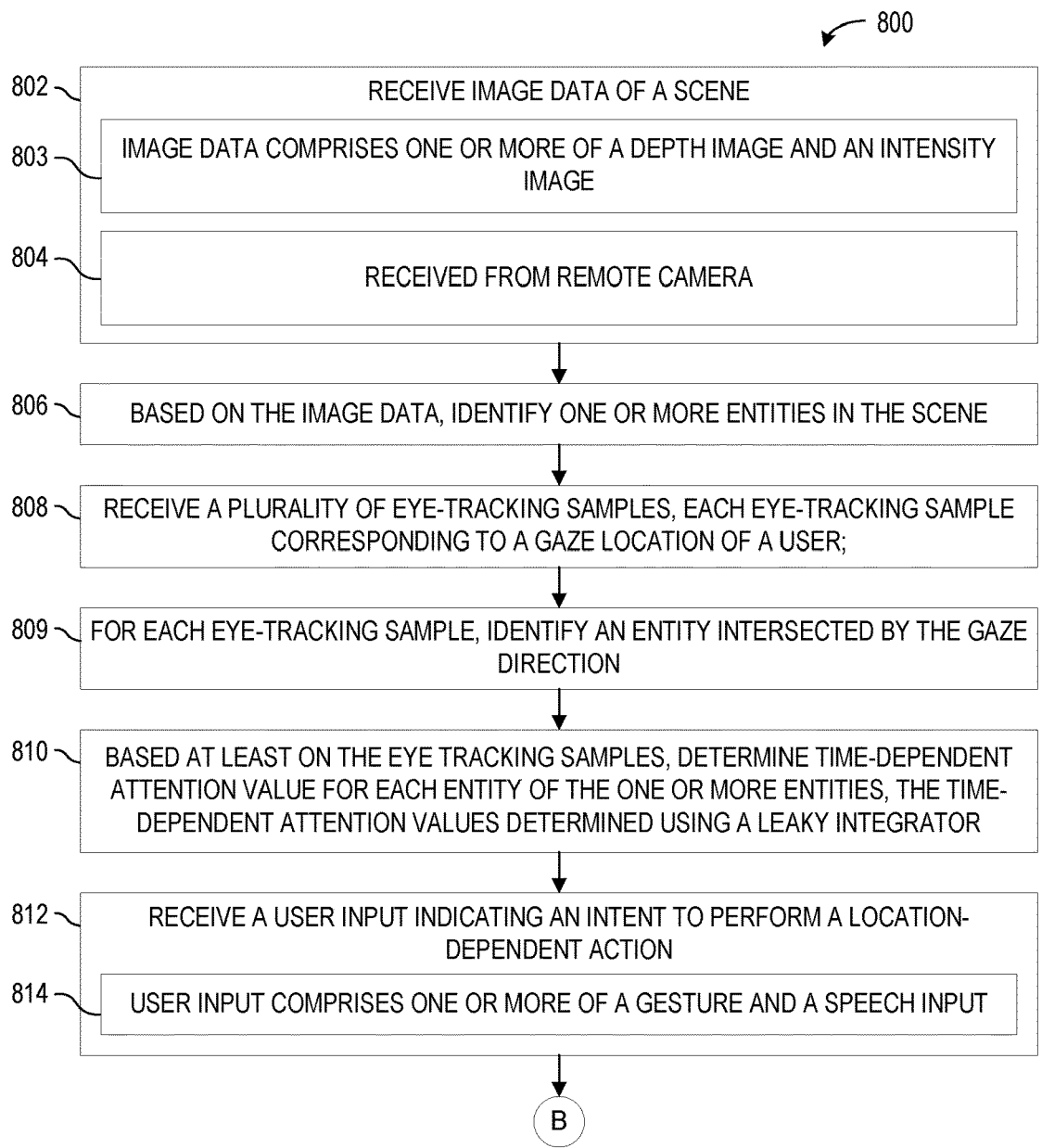
FIGS. 8A-8B shows a flow diagram for an example method for performing a location-dependent action.
Figure 8B:
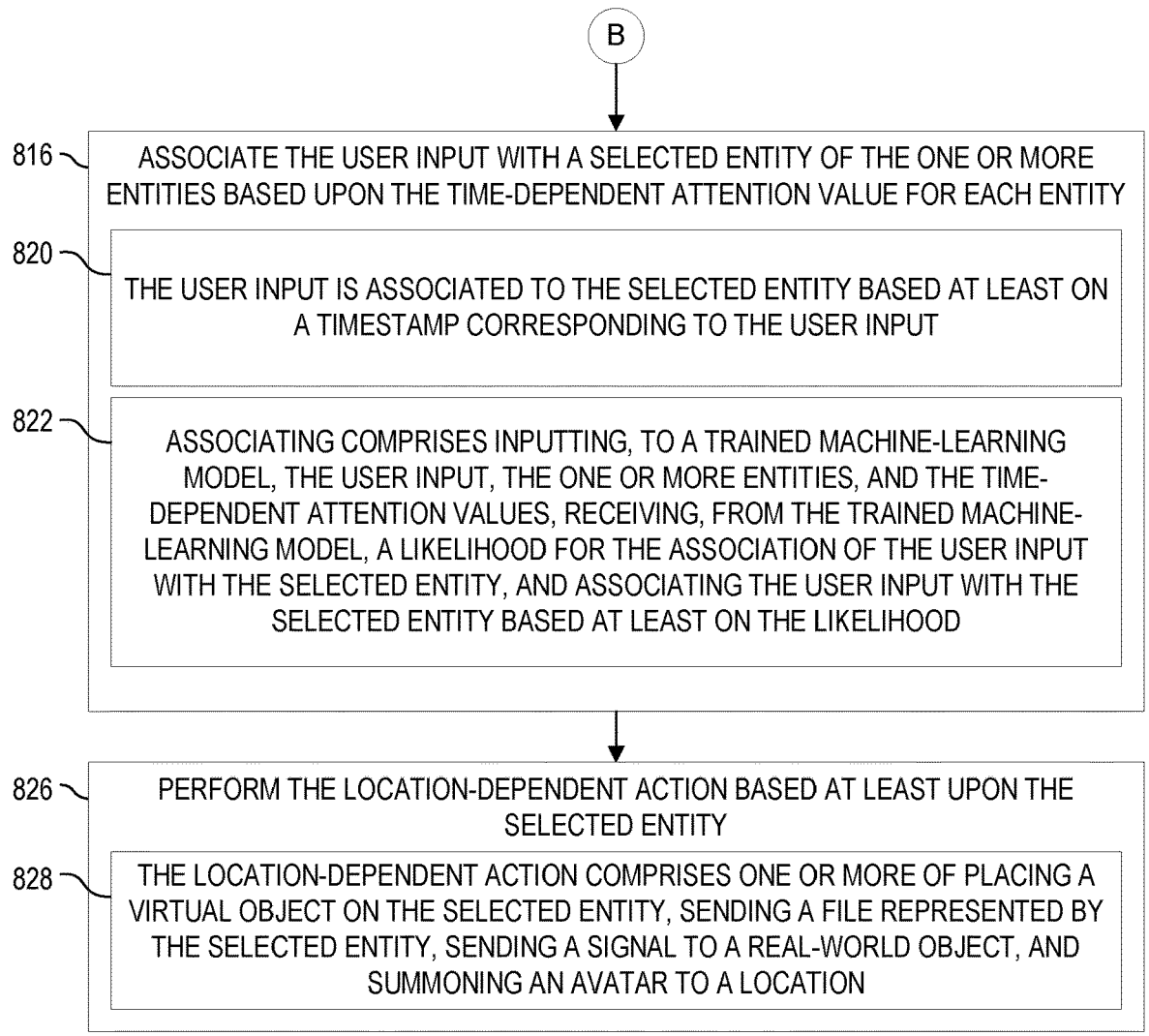

FIGS. 8A-8B shows a flow diagram depicting an example method 800 for using a spatial intent model (e.g., spatial intent model 501) to perform a location-dependent action on a computing device. Method 800 can be performed by devices 100 and 200, as examples. Further, one or more processes may be performed by a remote computing system, such as a cloud-based server.

At 802, method 800 comprises receiving image data of a scene. The image data may comprise one or more of depth image data and intensity image data. In some examples, the image data is received from a local depth camera as indicated at 804, while in other examples the image data is received from a remote source (e.g. a camera located in the use environment.

At 806, method 800 comprises, based on the image data, identifying one or more entities in the scene. For example, identifying one or more entities in the scene may involve classification of image data capturing images of the scene. Identifying one or more entities also can involve communicatively connecting to controllable electronic objects identified in the image data (e.g. pairing the augmented reality display device with another computing device, such as a tablet, monitor, smartphone, and/or other suitable device). Continuing, at 808, method 800 comprises receiving a plurality of eye tracking samples, each eye tracking sample corresponding to a gaze direction of a user. Next, at 809, the method comprises, for each eye tracking sample, identifying an entity intersected by the gaze direction of the eye tracking sample. At 810, the method comprises, based at least on the eye tracking samples, determining a time-dependent attention value for each entity of the one or more entities, the time-dependent attention values determined using a leaky integrator.

At 812, method 800 comprises receiving a user input indicating an intent to perform a location-dependent action. In some examples, at 814, the user input comprises one or more of a gesture and a speech input. The location-dependent action may comprise placing a virtual object, controlling a device, or any other suitable action, and the user input may include an ambiguous term.

Continuing with FIG. 8B, at 816, method 800 further comprises resolving an ambiguous term by associating the user input with a selected entity of the one or more entities based upon the time-dependent attention value for each entity. In some examples, at 820, the user input is associated with the selected entity based at least on a timestamp of user input corresponding to a timestamp of a set of time-dependent attention values for the one or more entities. Further, in some examples, at 822, associating the user input to the selected entity comprises inputting, to a trained machine-learning model, the user input, the one or more entities, and the time-dependent attention values, receiving, from the trained machine-learning model, a likelihood for the association of the user input with the selected entity, and associating the user input with the selected entity based at least on the likelihood. The selected entity can be a real-world object or a virtual object.

At 826, method 800 further comprises performing the location-dependent action based at least upon the selected entity. In some examples, at 828, the location-dependent action comprises one or more of placing a virtual object on the selected entity, sending a file represented by the selected entity, sending a signal to a real-world object, and summoning an avatar to a location.

With the above-described examples, user commands with ambiguous terms may be associated with intended entities without users having to resist natural saccadic eye motion to select an intended entity. In some examples, the processes described herein may be tied to a computing system comprising one or more computing devices. In particular, such methods and processes may be implemented as a computer-application program or service, an application-programming interface (API), a library, and/or other computer-program product.

Figure 9:
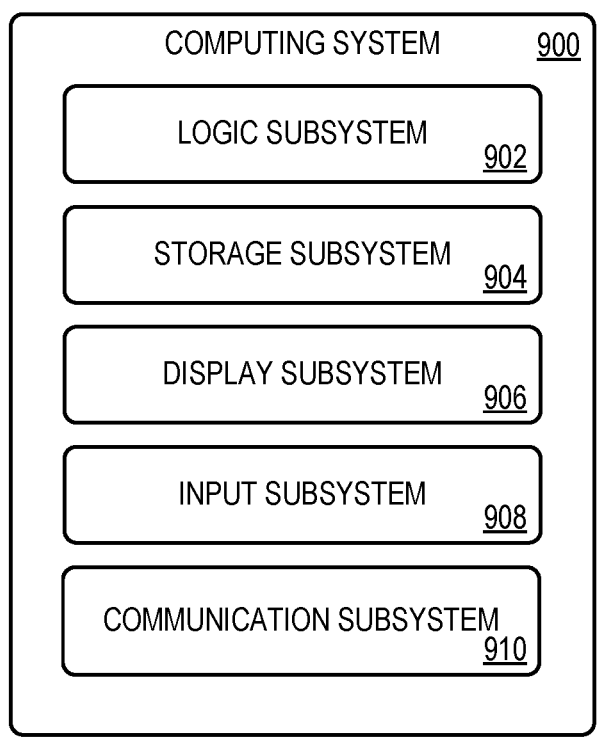
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. Display device 100, display device 200, and remote computing systems 130 and 250 are examples of computing system 900. Further, system 500 and method 800 may be implemented by computing system 900, as well as by devices 100, 200, and remote systems 130 and 250.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 900 implemented to perform a particular function. In some cases, a module or program may be instantiated via logic subsystem 902 executing instructions held by storage subsystem 904. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a computing device comprising a logic subsystem; and a storage subsystem holding instructions executable by the logic machine to receive information regarding one or more entities in a scene, receive, via an eye-tracking sensor, a plurality of eye tracking samples, each eye tracking sample corresponding to a gaze direction of a user, based at least on the eye tracking samples, determine a time-dependent attention value for each entity of the one or more entities, receive a user input indicating an intent to perform a location-dependent action, and associate the user input with a selected entity based at least upon the time-dependent attention value for the selected entity. In some such examples, the computing device may additionally or alternatively comprise a head-mounted computing device comprising one or more of the eye-tracking sensor, a depth camera, and a microphone. In some such examples, the instructions may additionally or alternatively be executable to receive information on the one or more entities by receiving, from a depth camera, a depth image of a scene, and based on the depth image, identifying one or more entities in the scene. In some such examples, the instructions may additionally or alternatively be executable to determine the time-dependent attention value for each entity of the one or more entities using a leaky integrator. In some such examples, the instructions executable to associate the user input to the selected entity may additionally or alternatively comprise instructions executable to input, to a trained machine-learning model, the user input, the one or more entities, and the time-dependent attention values, receive, from the trained machine-learning model, a likelihood for the association of the user input with the selected entity, and associate the user input with the selected entity based at least on the likelihood. In some such examples, the instructions may additionally or alternatively be executable to assign a timestamp for the user input and associate the user input with the selected entity by comparing the timestamp for the user input to a timestamp for the time-dependent attention value for the selected entity. In some such examples, wherein the selected entity is a first selected entity, wherein the user input comprises a first location-dependent term and a second location-dependent term, and the instructions may additionally or alternatively be executable to associate the second location-dependent term with a second selected entity based upon a time-dependent attention value for the second selected entity. In some such examples, the instructions may additionally or alternatively be further executable to store, for each entity, a plurality of time-dependent attention values, each time-dependent attention value for the entity corresponding to a different timestamp. In some such examples, the selected entity may additionally or alternatively comprise a real-world object or a virtual object. In some such examples, the location-dependent action may additionally or alternatively comprise placing a virtual object. In some such examples, the selected entity may additionally or alternatively comprise a virtual object representing an application, and the location-dependent action comprises controlling the application.

Another example provides a method on a computing device, the method comprising receiving a depth image of a scene; based on the depth image, identifying one or more entities in the scene; receiving a plurality of eye tracking samples, each eye tracking sample corresponding to a gaze direction of a user; based at least on the eye tracking samples, determining time-dependent attention value for each entity of the one or more entities, the time-dependent attention values determined using a leaky integrator; receiving a user input indicating an intent to perform a location-dependent action; associating the user input with a selected entity of the one or more entities based upon the time-dependent attention value for each entity; and performing the location-dependent action based at least upon the selected entity. In some such examples, the user input may additionally or alternatively comprise one or more of a gesture input and a speech input. In some such examples, associating the user input to the selected entity may additionally or alternatively comprise inputting, to a trained machine-learning model, the user input, the one or more entities, and the time-dependent attention values, receiving, from the trained machine-learning model, a likelihood for the association of the user input with the selected entity, and associating the user input with the selected entity based at least on the likelihood. In some such examples, the selected entity may additionally or alternatively comprise one or more of a real-world object and a virtual object. In some such examples, the selected entity may additionally or alternatively comprise a virtual object, and the location-dependent action comprises one or more of moving the virtual object and controlling an application represented by the virtual object. In some such examples, the depth image may additionally or alternatively be received from a depth camera remote to the computing system. In some such examples, associating the user input to the selected entity may additionally or alternatively comprise comparing time-dependent attention values for the one or more entities to a timestamp of the user input.

Another example provides a computing device comprising a logic machine; and a storage subsystem holding instructions executable by the logic machine to receive a plurality of eye tracking samples, each eye tracking sample corresponding to a gaze direction of a user, based at least on the eye tracking samples, determine time-dependent attention values for each entity of one or more entities at different locations in a use environment, the time-dependent attention values determined using a leaky integrator, determine a selected entity of the one or more entities based upon the time-dependent attention values for each entity, and determine a location for placing the virtual object based upon the selected entity. In some such examples, the instructions may additionally or alternatively be further executable to receive image data capturing the use environment and identify the one or more entities based upon the image data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a logic subsystem; and
a storage subsystem holding instructions executable by the logic machine to:
receive information regarding one or more entities in a scene,
receive, via an eye-tracking sensor, a plurality of eye tracking samples, each eye tracking sample corresponding to a gaze direction of a user,
based at least on the eye tracking samples, determine a time-dependent attention value for each entity of the one or more entities, each time-dependent attention value decaying over a period of time when a user looks away from a corresponding entity,
receive a user input indicating an intent to perform a location-dependent action, and
associate the user input with a selected entity based at least upon the time-dependent attention value for the selected entity.

2. The computing device of claim 1, wherein the computing device comprises a head-mounted computing device comprising one or more of the eye-tracking sensor, a depth camera, and a microphone.

3. The computing device of claim 1, wherein the instructions are executable to receive information on the one or more entities by receiving, from a depth camera, a depth image of a scene, and based on the depth image, identifying one or more entities in the scene.

4. The computing device of claim 1, wherein the instructions are executable to determine the time-dependent attention value for each entity of the one or more entities using a leaky integrator.

5. The computing device of claim 1, wherein instructions executable to associate the user input to the selected entity comprises instructions executable to:

input, to a trained machine-learning model, the user input, the one or more entities, and the time-dependent attention values,
receive, from the trained machine-learning model, a likelihood for the association of the user input with the selected entity, and
associate the user input with the selected entity based at least on the likelihood.

6. The computing device of claim 1, wherein the instructions are executable to assign a timestamp for the user input and associate the user input with the selected entity by comparing the timestamp for the user input to a timestamp for the time-dependent attention value for the selected entity.

7. The computing device of claim 6, wherein the selected entity is a first selected entity, wherein the user input comprises a first location-dependent term and a second location-dependent term, and wherein the instructions are executable to associate the second location-dependent term with a second selected entity based upon a time-dependent attention value for the second selected entity.

8. The computing device of claim 6, wherein the instructions are further executable to store, for each entity, a plurality of time-dependent attention values, each time-dependent attention value for the entity corresponding to a different timestamp.

9. The computing device of claim 1, wherein the selected entity comprises a real-world object or a virtual object.

10. The computing device of claim 1, wherein the location-dependent action comprises placing a virtual object.

11. The computing device of claim 1, wherein the selected entity comprises a virtual object representing an application, and the location-dependent action comprises controlling the application.

12. On a computing device, a method comprising:
receiving a depth image of a scene;
based on the depth image, identifying one or more entities in the scene;
receiving a plurality of eye tracking samples, each eye tracking sample corresponding to a gaze direction of a user;
based at least on the eye tracking samples, determining time-dependent attention value for each entity of the one or more entities, the time-dependent attention values determined using a leaky integrator such that each time-dependent attention value decays over a period of time when a user looks away from a corresponding entity;
receiving a user input indicating an intent to perform a location-dependent action;
associating the user input with a selected entity of the one or more entities based upon the time-dependent attention value for each entity; and
performing the location-dependent action based at least upon the selected entity.

13. The method of claim 12, wherein the user input comprises one or more of a gesture input and a speech input.

14. The method of claim 12, wherein associating the user input to the selected entity comprises:
inputting, to a trained machine-learning model, the user input, the one or more entities, and the time-dependent attention values, receiving, from the trained machine-learning model, a likelihood for the association of the user input with the selected entity, and
associating the user input with the selected entity based at least on the likelihood.

15. The method of claim 12, wherein the selected entity comprises one or more of a real-world object and a virtual object.

16. The method of claim 12, wherein the selected entity comprises a virtual object, and wherein the location-dependent action comprises one or more of moving the virtual object and controlling an application represented by the virtual object.

17. The method of claim 12, wherein the depth image is received from a depth camera remote to the computing system.

18. The method of claim 12, wherein associating the user input to the selected entity comprises comparing time-dependent attention values for the one or more entities to a timestamp of the user input.

19. A computing device comprising:

a logic machine; and a storage subsystem holding instructions executable by the logic machine to receive a plurality of eye tracking samples, each eye tracking sample corresponding to a gaze direction of a user, based at least on the eye tracking samples, determine time-dependent attention values for each entity of one or more entities at different locations in a use environment, the time-dependent attention values determined using a leaky integrator such that each time-dependent attention value decays over a period of time when a user looks away from a corresponding entity, determine a selected entity of the one or more entities based upon the time-dependent attention values for each entity, and determine a location for placing the virtual object based upon the selected entity.

20. The computing device of claim 19, wherein the instructions are further executable to receive image data capturing the use environment, and identify the one or more entities based upon the image data.

* * * * *